US008032588B2

(12) United States Patent
Fang et al.

(10) Patent No.: US 8,032,588 B2
(45) Date of Patent: *Oct. 4, 2011

(54) SYSTEM AND METHOD FOR HOSTING ONE OR MORE VERSIONS OF A SERVICE USING A SERVICE PROXY

(75) Inventors: Ru Fang, Beijing (CN); Liana L. Fong, Irvington, NY (US); David C. Frank, Ossining, NY (US); Manoj Khangaonkar, Pleasanton, CA (US); Linh H. Lam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 297 days.

This patent is subject to a terminal disclaimer.

(21) Appl. No.: 12/144,017

(22) Filed: Jun. 23, 2008

(65) Prior Publication Data

US 2009/0319651 A1 Dec. 24, 2009

(51) Int. Cl.
G06F 15/16 (2006.01)
G06F 17/00 (2006.01)
G06F 15/173 (2006.01)

(52) U.S. Cl. ........ 709/203; 707/695; 709/224; 709/226; 709/238

(58) Field of Classification Search ........... 709/201–203
See application file for complete search history.

(56) References Cited

U.S. PATENT DOCUMENTS

| 7,720,800 | B2 | 5/2010 | Fang et al. |
| 7,822,840 | B2 | 10/2010 | Chen et al. |
| 2006/0031850 | A1* | 2/2006 | Falter et al. ................ 719/320 |
| 2008/0140759 | A1* | 6/2008 | Conner et al. ............... 709/201 |

OTHER PUBLICATIONS

Frank, David C., et al., An Approach to Hosting Versioned Web Services, IEEE International Conference, Jul. 9-13, 2007, pp. 76-82, http://ieeexplore.ieee.org/Xplore/guesthome.jsp.
MSDN [online]; [retrieved on May 4, 2011]; retrieved from the Internet http://msdn.microsoft.com/architecture/solvenow/soveimpdes/defaultaspx?pull=/library/en-us/dnbda/html/SOADesignVer.asp John Evdemon, "Principles of Service Design: Service Versioning," 2005.

(Continued)

Primary Examiner — Ashok B Patel
Assistant Examiner — Evans Desrosiers
(74) Attorney, Agent, or Firm — Cantor Colburn LLP; Preston Young

(57) ABSTRACT

A method for hosting one or more versions of a service using a service proxy includes specifying an interface definition of a service which defines and uniquely identifies an interface version for the service, and an implementation definition of the service which uniquely identifies an implementation version for the service; generating one or more service proxies each representing an interface version of a service; providing a proxy configuration that contains entries for a plurality of service implementation versions, wherein each proxy utilizes the proxy configuration to access a certain one or more of the implementation versions which share the same or a compatible interface version of a service, and wherein the proxy configuration contains attributes that include information about each of the implementation versions; and wherein the proxy dynamically selects one of the implementation versions in the proxy configuration to route one or more client service requests to based on the attributes.

25 Claims, 6 Drawing Sheets

OTHER PUBLICATIONS

DeveloperWorks, [online]; [retrieved on May 4, 2011]; retrieved from the Internet http://www.ibm.com/developerworks/websphere/library/techarticles/0604_flurry/0604_flurry.html G. Flurry, "Dynamic Routing at Runtime in WebSphere Enterprise Service Bus," 2006.

DeveloperWorks, [online]; [retrieved on May 4, 2011]; retrieved from the Internet http://www.ibm.com/developerworks/websphere/library/techarticles/0512_phan2.htmI E. Herness, et al., "Introduction to Packaging in WebSphere Process Server," 2005.

OASIS [online]; [retrieved on May 4, 2011]; retrieved from the Internet http://uddi.org/pubs/uddi_v3.html UDDI Spec Version 3.0.2, UDDI Spec Technical Committee Draft, 2004, pp. 1-245.

OASIS [online]; [retrieved on May 4, 2011]; retrieved from the Internet http://www.oasis-open.org/committees/download.php/5664/wd-wsdm-mows_versioning_change_2.23.04a.doc OASIS: "Web Services Distributed Management: Management of Web Services (WSDM-MOWS)," 2003.

W3C [online]; [retrieved on May 4, 2011]; retrieved from the Internet http:/lwww.w3.org/TR/wsdl E. Christensen et al., "Web Services Description Language (WSDL) 1.1", pp. 1-31, 2001.

Ru Fang et al., "A Version-aware Approach for Web Service Client Application," Proceedings of the 10th IFIP/IEEE International Symposium on Integrated Network Management, 2007.

* cited by examiner

SYSTEM AND METHOD FOR HOSTING ONE OR MORE VERSIONS OF A SERVICE USING A SERVICE PROXY

BACKGROUND

The present invention relates generally to Web services and, more particularly, to a system and method for hosting one or more versions of a service using a service proxy.

Web services have become important building blocks of distributed applications due to the growing adoption of service-oriented computing. As a result, Web services have matured to the point where service lifecycle issues such as managing multiple versions of services have become inevitable as well as challenging. As such, the solutions to these issues have become paramount. Service version management is no exception. Versioning of Web services is challenging, because it inevitably affects each part of the service lifecycle. In particular, managing the transition between service versions is difficult in a distributed environment without explicit version support. In approaching this problem, one is faced with the fact that versioning in a distributed environment such as the Web is ultimately an end-to-end issue touching all aspects of the service lifecycle.

This lack of versioning support in relevant standards and tools has meant that developers have been forced to address this problem in an ad hoc manner with approaches that have limited the flexibility of both service providers and service consumers to accommodate change. The Web services model of once published/always published and the expectation of continuous availability of services make dealing with version changes especially difficult not only for service providers but also for service consumers and service developers.

A commonly-used solution for versioning a Web service is to create an entirely new Web service with a new Web services description language (WSDL) file and new namespaces. This is less than ideal, as it requires the re-building of client applications. Also, there is no meta-data to capture the changes and the relationship among different versions. The OASIS WSDM-MOWS 1.0 draft specification states that a Web service's description, interface, service, and endpoint can be separately versioned and defined in their own individual namespaces. This is an approach to describe the changes in detail, but does not address how to manage these separate versions in the deployment cycles. Other approaches focus on the data models and subscription and notification mechanisms for the service registry, and they also deal with the issues for the service consumer of how to discover and subscribe to a version of a service. Still other approaches introduce some application program interfaces (APIs) for generating a dynamic proxy for the service consumer so that the Web service client application does not need to be re-built every time the target service changes, although this approach does not address the needs of the service provider. Thus, the current approaches focus on controlling versions in the service registry and the service consumer.

What is needed is a system and method for solving the versioned service problem in such a way that is transparent to the existing service-client programming model (e.g., insulates service consumers from minor version changes), supports continuous service availability, allows for concurrent deployment and utilization of multiple versions, and gives services providers the flexibility to manage version transition decisions.

SUMMARY

The foregoing discussed drawbacks and deficiencies of the prior art are overcome or alleviated, in an exemplary embodiment, by a method for hosting one or more versions of a service using a service proxy that includes specifying an interface definition of a service which defines and uniquely identifies an interface version for the service, and specifying an implementation definition of the service which uniquely identifies an implementation version for the service; generating one or more service proxies, wherein each service proxy represents an interface version of a service; providing a proxy configuration that contains entries for a plurality of service implementation versions, wherein each service proxy utilizes the proxy configuration to access a certain one or more of the plurality of service implementation versions which share the same or a compatible interface version of a service, and wherein the proxy configuration contains attributes that include information about each of the plurality of service implementation versions; and wherein the service proxy dynamically selects one of the service implementation versions in the proxy configuration to route one or more client service requests to based on the proxy configuration attributes.

In another embodiment, a computer program product includes a computer readable computer program code for implementing a method for hosting one or more versions of a service using a service proxy; and instructions for causing a computer to implement a method, the method further including specifying an interface definition of a service which defines and uniquely identifies an interface version for the service, and specifying an implementation definition of the service which uniquely identifies an implementation version for the service; generating one or more service proxies, wherein each service proxy represents an interface version of a service; providing a proxy configuration that contains entries for a plurality of service implementation versions, wherein each service proxy utilizes the proxy configuration to access a certain one or more of the plurality of service implementation versions which share the same or a compatible interface version of a service, and wherein the proxy configuration contains attributes that include information about each of the plurality of service implementation versions; and wherein the service proxy dynamically selects one of the service implementation versions in the proxy configuration to route one or more client service requests to based on the proxy configuration attributes.

A system for implementing the hosting of or one or more versions of a service using an interface proxy includes a computing network including a processing device in communication with one or more computer memory storage devices; and the computing network further configured to implement a method for hosting one or more versions of a service using a service proxy, the method further including specifying an interface definition of a service which defines and uniquely identifies an interface version for the service, and specifying an implementation definition of the service which uniquely identifies an implementation version for the service; generating one or more service proxies, wherein each service proxy represents an interface version of a service; providing a proxy configuration that contains entries for a plurality of service implementation versions, wherein each service proxy utilizes the proxy configuration to access a certain one or more of the plurality of service implementation versions which share the same or a compatible interface version of a service, and wherein the proxy configuration contains attributes that include information about each of the plurality of service implementation versions; and wherein the service proxy dynamically selects one of the service implementation versions in the proxy configuration to route one or more client service requests to based on the proxy configuration attributes.

BRIEF DESCRIPTION OF THE DRAWINGS

Referring to the exemplary drawings wherein like elements are numbered alike in the several Figures.

DETAILED DESCRIPTION

Disclosed herein is a system and method for hosting one or more versions of a service (more generically, a function provider) using a service proxy. Briefly stated, a distinction is made between a Web service's interface (published) version and its implementation (private) version, which insulates the caller from constant implementation changes (e.g., bug fixes) while clearly defining a particular caller's interface behavior expectations. This allows the provider to manage implementation versions transparently to the caller. In WSDL, a service description document is partitioned into abstract and concrete portions, which in effect separates the interface definition from its implementation. The present invention leverages the way WSDL separates the interface and implementation portions for an un-versioned service specification to build a versioned service hosting model based on a partitioned interface/implementation versioning model. Following this type of partitioned versioning model, a service proxy is interposed between the service's client(s) and the actual implementation of the service. This proxy, which can be generated automatically, clones the service interface of its target service. The proxy represents the service interface version and is published as the logical service for client use. The proxy then dynamically selects implementation versions to route service requests to according to a service version configuration. Through means of control mechanisms like GUI or script or commands, an agent can control the version configuration on how to dynamically select the implementation versions. Service clients are thus bound to a service interface version through the proxy; that is, the proxy maps service requests to an implementation version dynamically.

Figure 1:
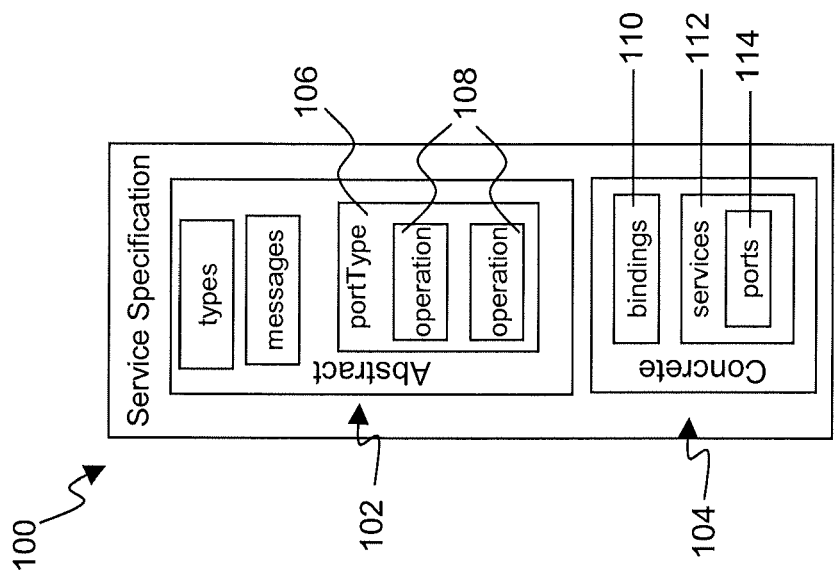
FIG. 1 illustrates a service specification (as in the WSDL version 1.1) divided into an interface definition and an implementation definition.

Referring to FIG. 1, there illustrated is service specification 100, which defines Web services in a consistent manner for interfacing with other services and applications. The service specification 100 may comprise a WSDL service description, which describes the point of contact for a service (i.e., the service "endpoint"), thereby establishing the physical location of the service and providing a formal definition of the endpoint interface. This way, any program wanting to communicate with the service knows exactly how to structure the required request message.

The description 100 is partitioned into an abstract portion 102 and a concrete portion 104. The abstract portion 102 defines the published interface characteristics of the Web service without any reference to the technology used to host or enable a Web service for message communication. Thus, the abstract portion 102 acts as an interface definition that defines and uniquely identifies a service interface. The abstract portion 102 includes a "portType" 106, which is a set of abstract operations 108 or functions performed by the service. The operations 108 have input and output parameters that comprise messages. As described in more detail hereinafter, the present invention utilizes the portType of the abstract portion 102 of the service specification 100 as the implicit interface (published) version.

The concrete portion 104 of the service specification (as in WSDL) 100 defines a connection between the abstract Web service interface portion 102 to a physical transport protocol, which is the underlying technology needed for a Web service to be implemented or executed. As shown in FIG. 1, the concrete portion 104 includes bindings 110 and services 112. A binding 110 (e.g., SOAP—Simple Object Access Protocol) represents a transport technology that the Web service can use to communicate. A service 112 refers to a group of related endpoints. The services 112 include ports 114, which each represents the physical address at which a service can be accessed with a specific protocol. Thus, the service specification 100 separates the interface and implementation portions for an un-versioned service definition. Thus, the concrete portion 104 acts as an implementation definition that specifies and uniquely identifies a service implementation version. As described in more detail hereinafter, the system and method of the present invention take advantage of this WSDL un-versioned approach to build a Web service version hosting model based on a partitioned interface/implementation versioning model.

Figure 2:
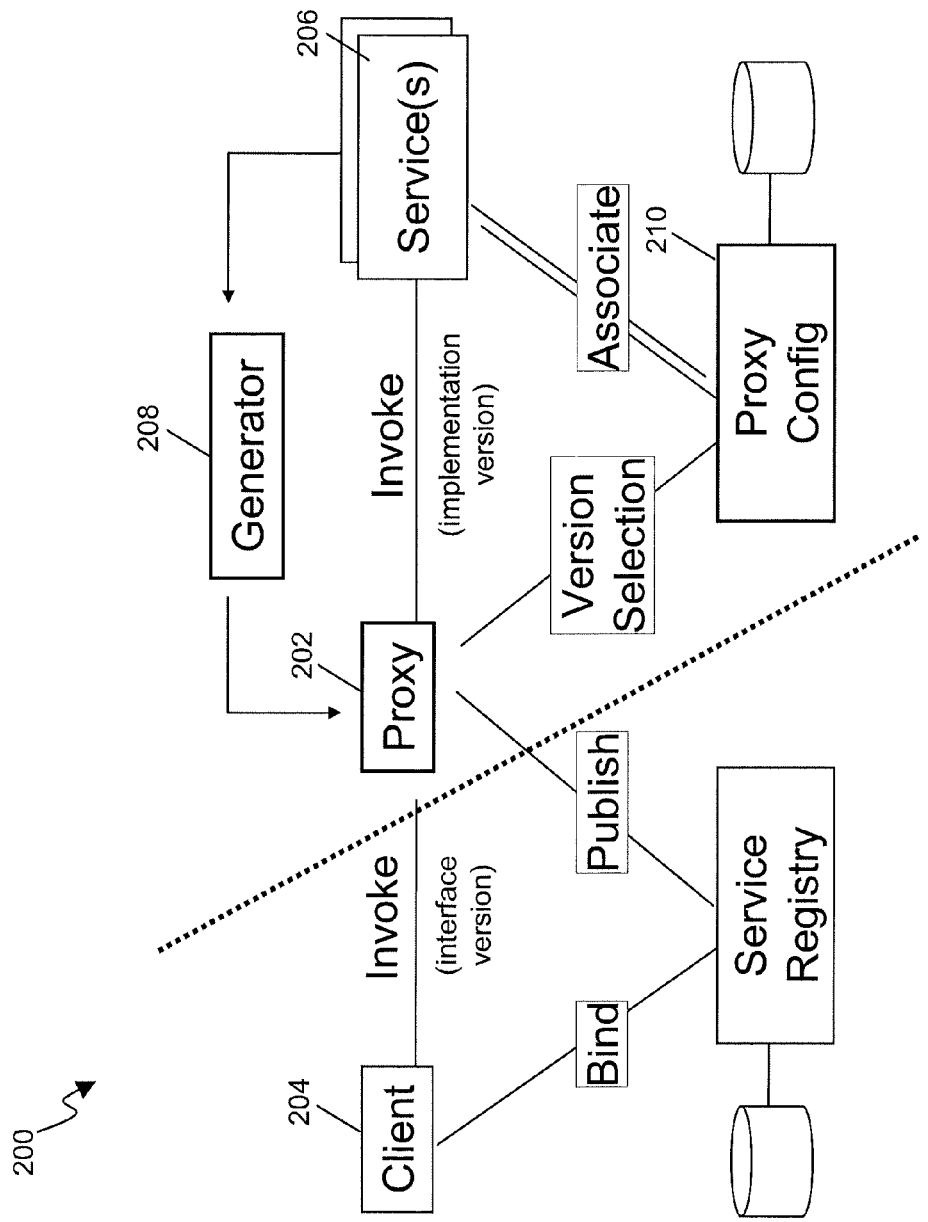
FIG. 2 is a block diagram of a system and method for hosting one or more versions of a service system and method according to an exemplary embodiment of the present invention.

Referring to FIG. 2, there illustrated is a block diagram of a system and method for hosting one or more versions of a service using a service proxy according to an exemplary embodiment of the present invention. The system and method insulate service clients from implementation dependencies while clearly defining their interface behavior expectations. The present invention also gives the service provider the flexibility to manage implementation changes transparently to service consumers. In support of a version hosting system that supports a public interface version/private implementation version model 200 illustrated in FIG. 2, a service proxy 202 is utilized which acts as an intermediary between one or more clients 204 and various service implementation versions 206. One or more service proxies 202 may be generated, wherein each service proxy represents an interface version of a service. The proxy 202 may be generated in an automated manner, for example, by cloning the corresponding service interface associated with one of the service implementation versions 206. This automated generation of the service proxy 202 may be carried out by a proxy generator 208. The proxy 202 shares the same interface with the target service implementation version 206. Each of the service implementation versions 206 may be associated with one or more service proxies 202 that support a compatible service interface. The proxy 202 and its interface are published as the logical service endpoint for a particular client interface version. Clients 204 bind to and make service requests to the service proxy 202, unaware of its intermediary role. The service proxy 202 in turn dynamically redirects these service requests to an appropriate implementation version.

Figure 3:
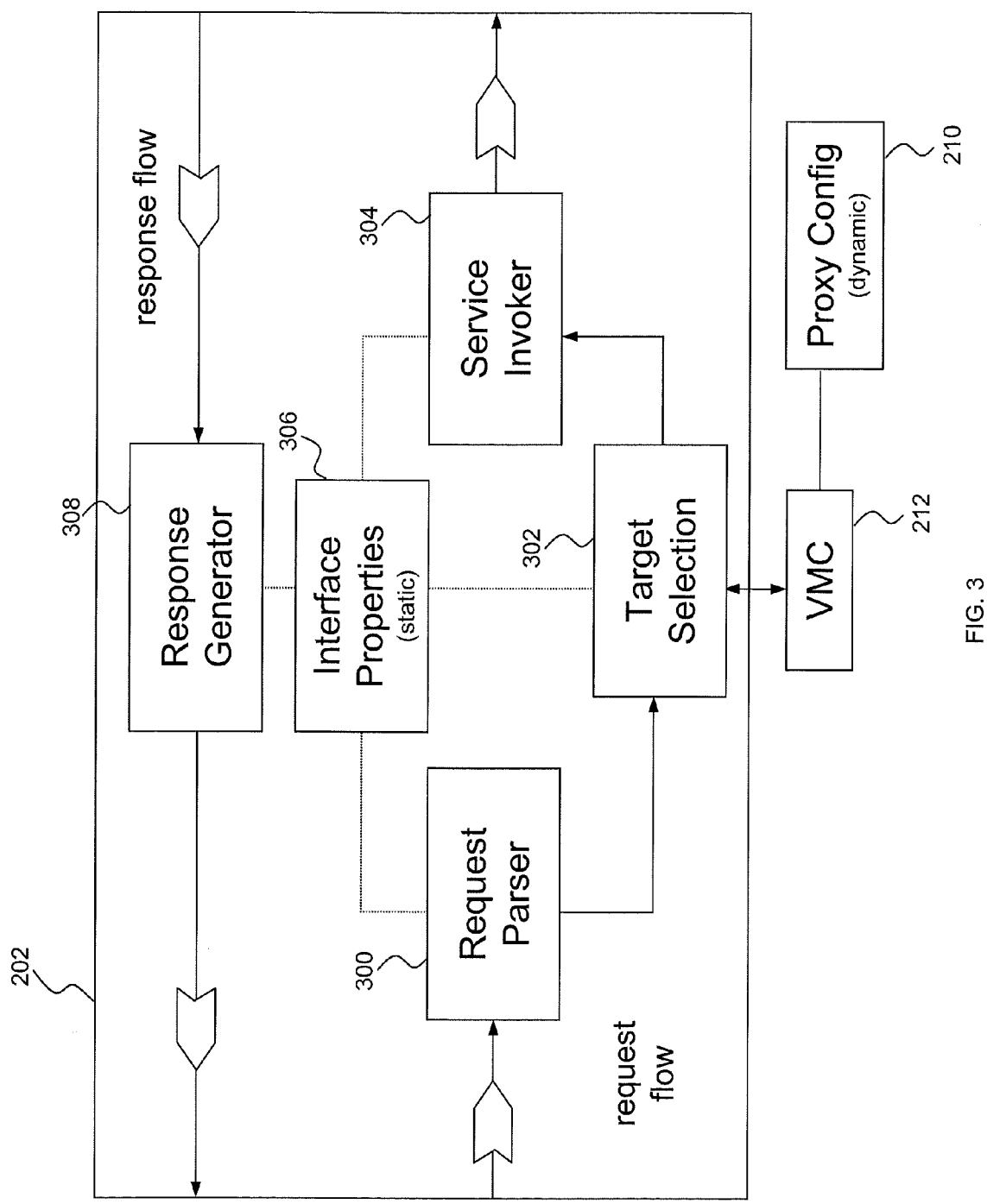
FIG. 3 is a detailed block diagram of the proxy component within the system and method of FIG. 2.

A proxy configuration 210 contains entries for a plurality of the service implementation versions 206. Each service proxy 202 utilizes a proxy configuration 210 that contains one or more service implementation versions that share a similar or compatible service interface. The proxy configuration 210 contains attributes that include information about the corresponding service implementation version 206. The proxy configuration 210 works with a Version Management Controller (VMC) 212 (FIG. 3). The service proxy 202 dynamically selects one of the service implementation versions 206 in the proxy configuration 210 to route one or more client service requests to based on the corresponding proxy configuration 210 attributes. The attributes may include the service implementation version 206 that is active at a certain point in time or that is valid for a certain period of time. The proxy configuration 210 may be modifiable either manually or automatically. The proxy configuration 210 is modifiable by adding or removing one of the service implementation versions 206 from the proxy configuration 210, or by modifying the proxy configuration 210 attributes associated with one of the service implementation versions 206 within the proxy configuration 210. An agent may control the proxy mapping behavior through use of a proxy mapping table within the proxy configuration 210.

FIG. 3 is a detailed block diagram of the proxy 202 of FIG. 2. The proxy 202 may be implemented as a service bus mediation component. The proxy 202 filters service requests, and then uses the VMC 212 to search the proxy configuration 210 to select the appropriate implementation version endpoint. The request target is then dynamically modified to be the endpoint of the selected service implementation version 206. Response messages from the service implementation are repackaged and then passed back to the invoking service client.

In FIG. 3, the service interface proxy 202 includes various components, with the functions of the proxy components being broken down as follows. First, the request parser 300 parses the request message. Depending on the messaging protocol, the version information will need to be encoded differently, so this step must be protocol aware. If no version information is encoded, the current default version in 210 will be used to service the request. Once the version information is retrieved, the target selection 302 passes this information to the VMC 212 and invokes the mapping APIs exposed by the VMC 212 to determine the correct target service. The VMC 212 returns the necessary invocation information of the target service, for example, the namespace attribute, the endpoint address, etc. Then the service invoker 304 transforms the request message according to the service information returned from the VMC 212 and the proxy interface properties 306 (for example, changing the endpoint address in the message). The service invoker 304 then dynamically re-routes the request through the service bus to the endpoint of the target service implementation version 206. When the target service returns the response message, the response generator 308 transforms the response message and sends it back to the client application.

Figure 4:
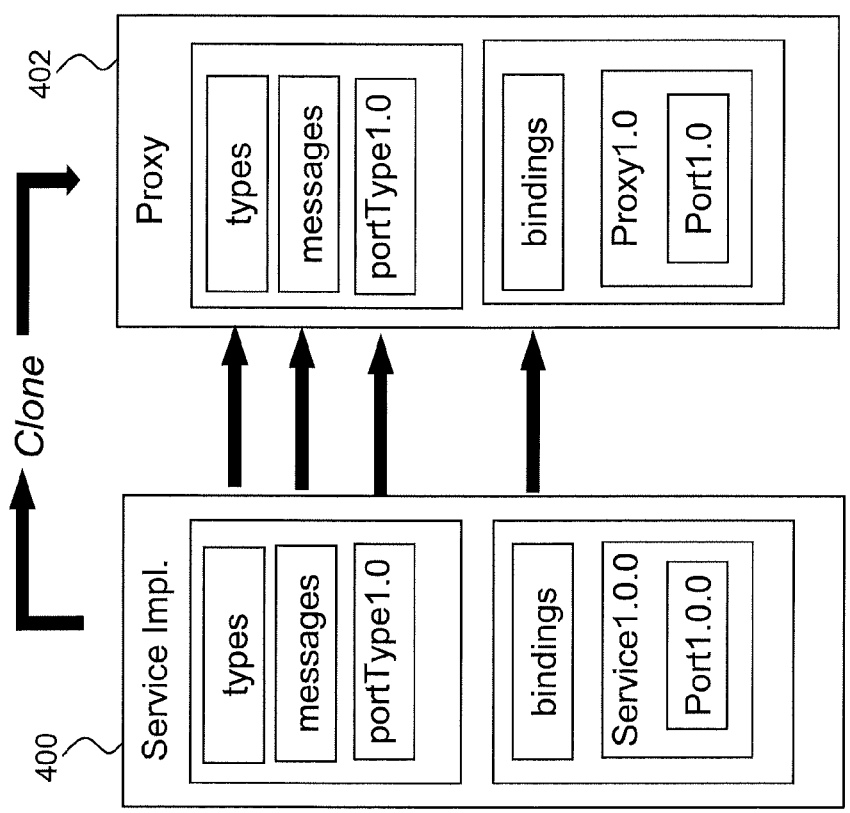
FIG. 4 illustrates the cloning of the interface of the service implementation to generate the service proxy, given a service implementation WSDL definition.

The service interface proxy 202 acts as a stable virtual service endpoint which service clients can bind to. It exposes the same interface as the service implementation(s). The well-defined separation of interface and implementation details in the service specification 100 lends itself to automating the generation of the proxy 202. Referring to FIG. 4, given a service implementation WSDL definition, it is possible to clone the interface 400 of the service implementation as the proxy's interface 402. For design simplicity, the proxy 202 also clones its bindings from the service implementation. The cloning of the service WSDL makes it possible to automatically generate a service interface proxy 202 whenever there is a need for a new service interface. Specifically, the service implementation 400 in WSDL is read and a new service definition 402 is created. The creation involves the cloning of the source interface components; e.g., the types, messages, operations and portTypes, along with the bindings. The new implementation includes the services, ports, endpoints, etc. The new service specification is published as WSDL to service consumers. One convention is that the portType version is used to create the proxy serviceName. Also, it is possible to overload the portType and serviceName with version information.

Figure 5:
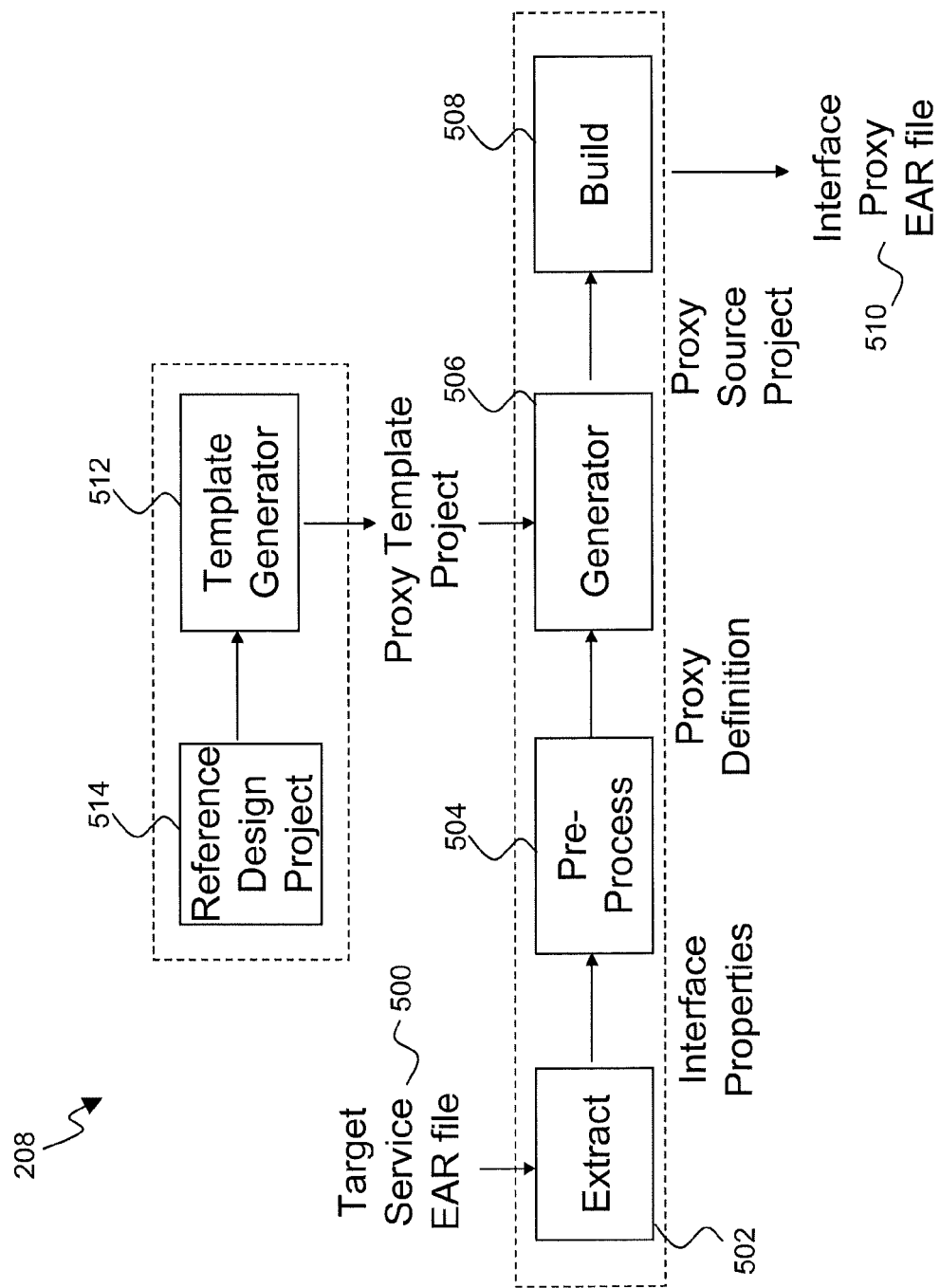
FIG. 5 is a detailed block diagram of the proxy generator within the system and method of FIG. 2.

FIG. 5 shows a detailed view of the proxy generator 208 of FIG. 2. The generator locates the WSDL file(s) from a service implementation EAR file 500 and extracts the data in a block 502 and saves them as the interface properties. Data in the interface properties include the abstract part of the service WSDL and the service binding. The pre-process block 504 uses the interface properties as seed parameters to generate a new proxy definition. The proxy definition contains information needed to populate the proxy template project which can be generated by the Template Generator 512 based on the Reference Design Project 514, for example: the WSDL interface description (portType, messages, bindings); created values for the proxy (new targetNamespace, portName, serviceName); generated unique identifiers (J2EE project, EJB, Web module IDs, binding IDs). The proxy definition is then used in the generator 506 to populate the proxy template project to create a proxy source project for a new service interface. This source project is used in the build block 508 to be compiled and packaged as a deployable EAR file 510.

This generation process can be used either at development time or on demand at the deployment time in the hosting environment. The output of the generator 506 is both a deployable EAR file and a service specification like a WSDL definition for the proxy service that can be published for service consumers to bind to. The service interface proxy 202 is customized to the middleware environment it is deployed in. For example, in the IBM WebSphere Enterprise Service Bus (WESB), the proxy 202 is developed as a WESB mediation module and deployed as an EAR file. The Service Deploy tool, provided by the WESB product, may be utilized to build and deploy the EAR file.

As a possible implementation, the proxy 202 of FIG. 3 can be generated by the proxy generator 208 of FIG. 5 on an IBM WebSphere Process Server (WPS), which includes the WebSphere Enterprise Service Bus (WESB), with its mediation mechanism utilized. To address the need for version coexistence, the application namespace can be overloaded, embedding the implementation version into the application name, which created unique service names without resource conflicts. The proxy configuration uses these application names to locate the unique endpoints to route requests to. For purpose of illustration, the proxy configuration can be implemented as a flat properties file. However, the proxy configuration may also be in a database, or any other object (such as a properties file) that can be used to store and look up the configuration. The VMC 212 (FIG. 3) can have an interface to work with the proxy configuration and can have management APIs like Associate and Modify and can be implemented as a collection of JAVA classes. Administrative JACL scripts can be written which use the VMC configuration APIs to view and modify the proxy configuration. The proxy 202 can be deployed as a mediation service on WPS for example.

The system and method of the present invention leverages the existing WSDL service definition to create a versioned service solution that addresses the versioning needs of both service consumers and providers. Specifically, in the context of a working system, an automated service interface proxy dynamically maps service requests to implementation versions, which insulates service consumers from implementation changes while giving service providers the flexibility to manage versioned services.

Figure 6:
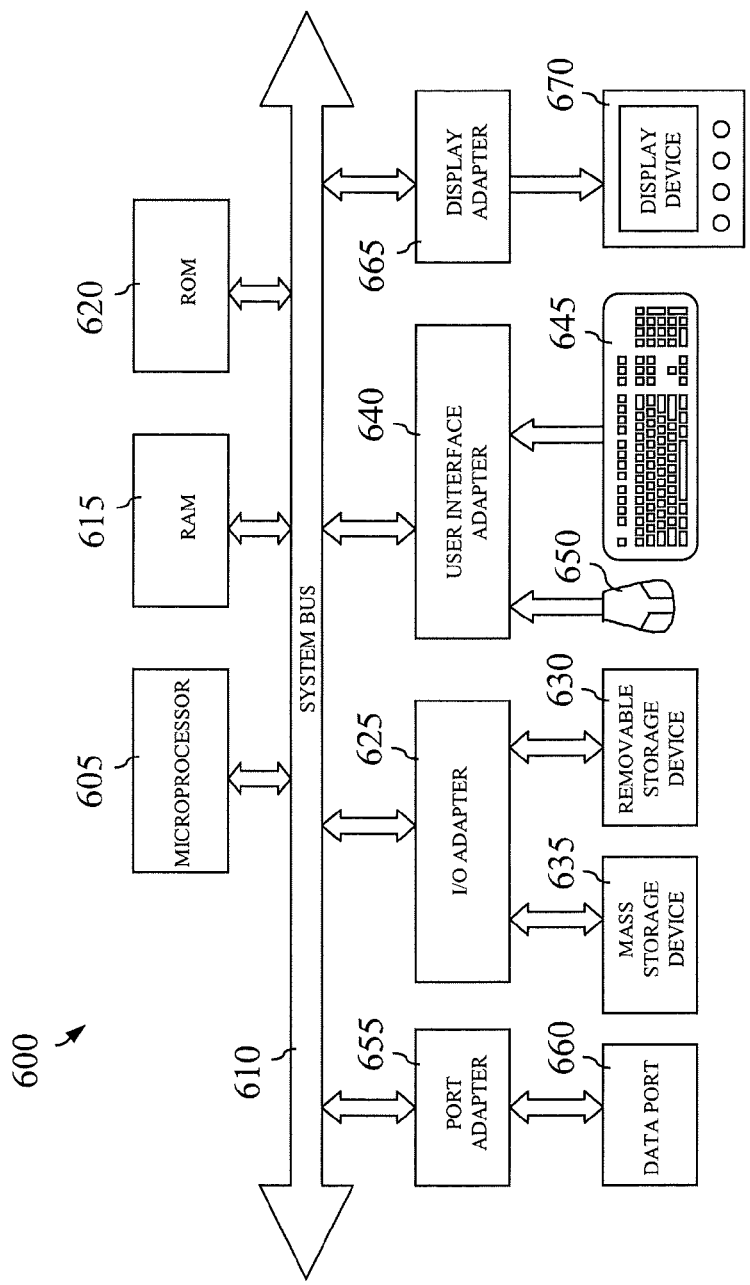
FIG. 6 is a schematic block diagram of a general-purpose computer suitable for practicing embodiments of the present invention.

Generally, the method embodiments for hosting one or more versions of a service using a service proxy may be practiced with a general-purpose computer and the method may be coded as a set of instructions on removable or hard media for use by the general-purpose computer. FIG. 6 is a schematic block diagram of a general-purpose computer suitable for practicing embodiments of the present invention. In FIG. 6, computer system 600 has at least one microprocessor or central processing unit (CPU) 605. CPU 605 is interconnected via a system bus 610 to a random access memory (RAM) 615, a read-only memory (ROM) 620, an input/output (I/O) adapter 625 for a connecting a removable data and/or program storage device 630 and a mass data and/or program storage device 635, a user interface adapter 640 for connecting a keyboard 645 and a mouse 650, a port adapter 655 for connecting a data port 660 and a display adapter 665 for connecting a display device 670.

ROM 620 contains the basic operating system for computer system 600. The operating system may alternatively reside in RAM 615 or elsewhere as is known in the art. Examples of removable data and/or program storage device 630 include magnetic media such as floppy drives and tape drives and optical media such as CD ROM drives. Examples of mass data and/or program storage device 635 include hard disk drives and non-volatile memory such as flash memory. In addition to keyboard 645 and mouse 650, other user input devices such as trackballs, writing tablets, pressure pads, microphones, light pens and position-sensing screen displays may be connected to user interface 640. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 630, fed through data port 660 or typed in using keyboard 645.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIG. 2.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. Method for hosting one or more versions of a service using a service proxy, the method comprising:
   specifying, by a computer, an interface definition of a service which defines and uniquely identifies an interface version for the service, and specifying an implementation definition of the service which uniquely identifies an implementation version for the service;
   generating, by the computer, one or more service proxies, wherein each service proxy represents an interface version of a service;
   providing, by the computer, a proxy configuration that contains entries for a plurality of service implementation versions, wherein each service proxy utilizes the proxy configuration to access a certain one or more of the plurality of service implementation versions which share the same or a compatible interface version of a service, and wherein the proxy configuration contains attributes that include information about each of the plurality of service implementation versions; and
   wherein the service proxy dynamically selects one of the service implementation versions in the proxy configuration to route one or more client service requests to based on the proxy configuration attributes.

2. The method of claim 1, wherein the proxy configuration attributes include the service implementation version that is active at a certain point in time or that is valid for a certain period of time.

3. The method of claim 1, wherein generating each service proxy includes cloning the corresponding interface version of a service that is associated with one of the service implementation versions.

4. The method of claim 1, wherein generating a service proxy is performed in an automated manner.

5. The method of claim 1, wherein the proxy configuration is modifiable either manually or automatically.

6. The method of claim 5, wherein the proxy configuration is modifiable by adding or removing one of the service implementation versions from the proxy configuration, or by modifying the proxy configuration attributes associated with one of the service implementation versions within the proxy configuration.

7. The method of claim 1, wherein each of the service implementation versions is associated with one or more service proxies that support a compatible interface version of the service.

8. A computer program product, comprising:
   a tangible non-transitory storage medium readable by a processing circuit and storing instructions for implementing a method for hosting one or more versions of a service using a service proxy
the method comprising:
specifying an interface definition of a service which defines and uniquely identifies an interface version for the service, and specifying an implementation definition of the service which uniquely identifies an implementation version for the service;
generating one or more service proxies, wherein each service proxy represents an interface version of a service;
providing a proxy configuration that contains entries for a plurality of service implementation versions, wherein each service proxy utilizes the proxy configuration to access a certain one or more of the plurality of service implementation versions which share the same or a compatible interface version of a service, and wherein the proxy configuration contains attributes that include information about each of the plurality of service implementation versions; and
wherein the service proxy dynamically selects one of the service implementation versions in the proxy configuration to route one or more client service requests to based on the proxy configuration attributes.

9. The computer program product of claim 8, wherein the proxy configuration attributes include the service implementation version that is active at a certain point in time or that is valid for a certain period of time.

10. The computer program product of claim 8, wherein generating each service proxy includes cloning the corresponding interface version of a service that is associated with one of the service implementation versions.

11. The computer program product of claim 8, wherein generating a service proxy is performed in an automated manner.

12. The computer program product of claim 8, wherein the proxy configuration is modifiable either manually or automatically.

13. The computer program product of claim 12, wherein the proxy configuration is modifiable by adding or removing one of the service implementation versions from the proxy configuration, or by modifying the proxy configuration attributes associated with one of the service implementation versions within the proxy configuration.

14. The computer program product of claim 8, wherein each of the service implementation versions is associated with one or more service proxies that support a compatible interface version of the service.

15. A system for hosting one or more versions of a service using a service proxy, comprising:
a computing network including a processing device in communication with one or more computer memory storage devices; and
the computing network further configured to implement a method for hosting one or more versions of a service using a service proxy, the method further including:
specifying an interface definition of a service which defines and uniquely identifies an interface version for the service, and specifying an implementation definition of the service which uniquely identifies an implementation version for the service;
generating one or more service proxies, wherein each service proxy represents an interface version of a service;
providing a proxy configuration that contains entries for a plurality of service implementation versions, wherein each service proxy utilizes the proxy configuration to access a certain one or more of the plurality of service implementation versions which share the same or a compatible interface version of a service, and wherein the proxy configuration contains attributes that include information about each of the plurality of service implementation versions; and
wherein the service proxy dynamically selects one of the service implementation versions in the proxy configuration to route one or more client service requests to based on the proxy configuration attributes.

16. The system of claim 15, wherein the proxy configuration attributes include the service implementation version that is active at a certain point in time or that is valid for a certain period of time.

17. The system of claim 15, wherein generating each service proxy includes cloning the corresponding interface version of a service that is associated with one of the service implementation versions.

18. The system of claim 15, wherein generating a service proxy is performed in an automated manner.

19. The system of claim 15, wherein the proxy configuration is modifiable either manually or automatically.

20. The system of claim 19, wherein the proxy configuration is modifiable by adding or removing one of the service implementation versions from the proxy configuration, or by modifying the proxy configuration attributes associated with one of the service implementation versions within the proxy configuration.

21. The system of claim 15, wherein each of the service implementation versions is associated with one or more service proxies that support a compatible interface version of the service.

22. A method for hosting one or more versions of a function provider using a proxy, the method comprising:
specifying, by a computer, an interface definition of a function provider component which defines and uniquely identifies an interface version for the component, and specifying an implementation definition of the function provider component which uniquely identifies an implementation version for the component;
generating, by the computer, one or more proxies, wherein each proxy represents an interface version;
providing, by the computer, a proxy configuration which contains entries for a plurality of implementation versions, wherein each proxy utilizes the proxy configuration to access a certain one or more of the plurality of implementation versions which share the same or a compatible interface version, and wherein the proxy configuration contains attributes that include information about each of the plurality of implementation versions; and
wherein the proxy dynamically selects one of the implementation versions in the proxy configuration to route one or more client requests to based on the proxy configuration attributes.

23. The method of claim 22, wherein the proxy configuration attributes include the implementation version that is active at a certain point in time or that is valid for a certain period of time.

24. The method of claim 22, wherein generating each proxy includes cloning the corresponding interface version that is associated with one of the implementation versions.

25. The method of claim 22, wherein the proxy configuration is modifiable either manually or automatically, and wherein the proxy configuration is modifiable by adding or removing one of the implementation versions from the proxy configuration, or by modifying the proxy configuration attributes associated with one of the implementation versions.

* * * * *